United States Patent

[11] 3,597,988

| [72] | Inventor | Herbert G. Hecketsweiler<br>Florence, Colo. |
|---|---|---|
| [21] | Appl. No. | 869,593 |
| [22] | Filed | Oct. 27, 1969 |
| [45] | Patented | Aug. 10, 1971 |
| [73] | Assignee | Portec, Inc. |

[54] SELF-ALIGNING SPROCKET
21 Claims, 11 Drawing Figs.

[52] U.S. Cl............................................... 74/243 C,
 74/243 DR
[51] Int. Cl........................................... F16h 55/30
[50] Field of Search.......................................... 74/243 C,
 243 R

[56] References Cited
UNITED STATES PATENTS
2,823,553  2/1958  Harrington.................. 74/243

*Primary Examiner*—Leonard H. Gerin
*Attorney*—Van Valkenburgh and Lowe

ABSTRACT: A sprocket-chain drive for use with a conveyor system having a straight conveyor belt and a conveyor belt turn and including an adjustable sprocket to operatively connect the shafts of the straight conveyor and turn which do not lie in spaced parallelism. The adjustable sprocket, mounted upon a spherical head secured to the shaft, is adapted to tip out of the plane of the normal of the shaft to align itself with the chain and other sprocket of the drive. A guide is used to hold the adjustable sprocket in its proper position with respect to the chain.

Patented Aug. 10, 1971

INVENTOR.
Herbert G. Hecketsweiler
BY
Van Valkenburgh & Lowe

ATTORNEYS

Patented Aug. 10, 1971
3,597,988
2 Sheets-Sheet 2
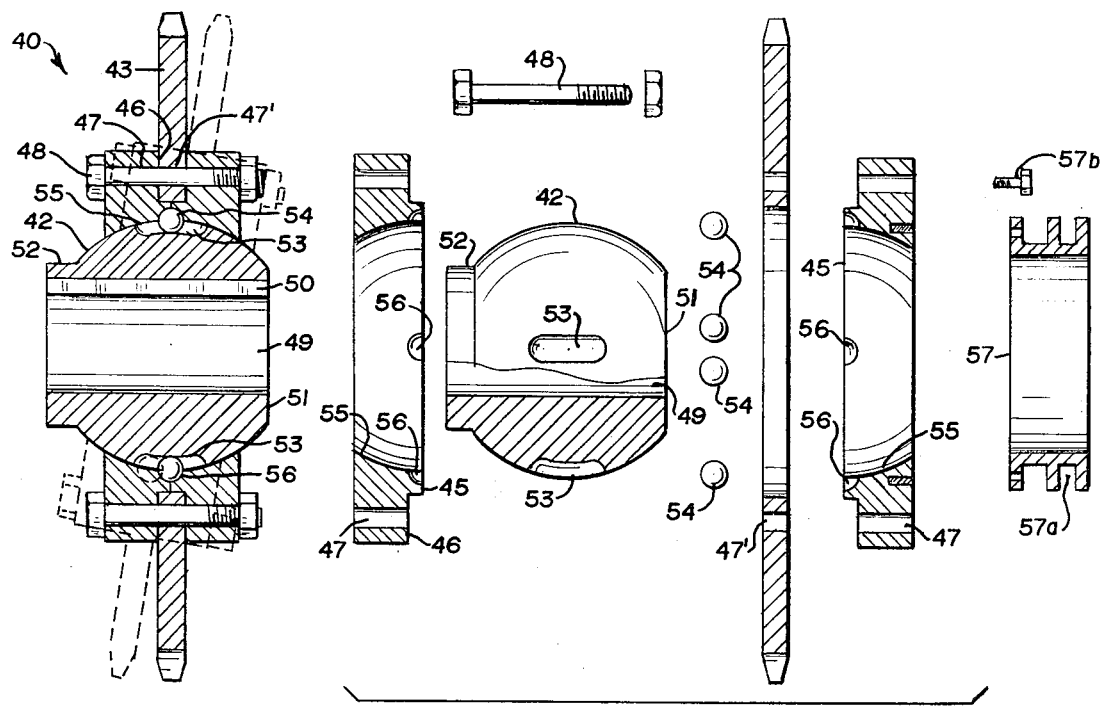
Fig. 8
Fig. 9
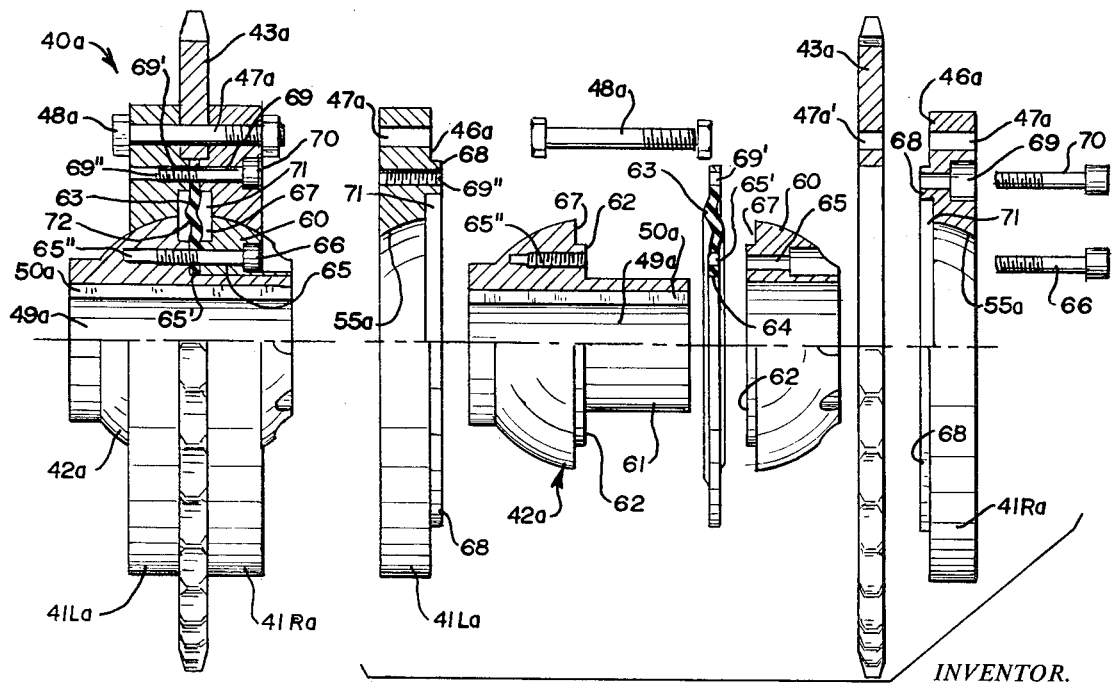
Fig. 10
Fig. 11
INVENTOR.
Herbert G. Hecketsweiler
BY
Van Valkenburgh & Lowe
ATTORNEYS

SELF-ALIGNING SPROCKET

This invention relates to operatively connecting a straight conveyor belt and a conveyor belt turn where the two are aligned in tandem. The invention also relates to the provision of a sprocket-chain drive connection between shafts which are not parallel, as a connection between a straight conveyor and a conveyor turn, and more particularly to a self-aligning sprocket in such a connection.

In a straight conveyor system where several belts are arranged in tandem, it is a common practice to interconnect two adjacent belts with a sprocket-chain drive so that the movement of one belt will drive the other. A sprocket is mounted on the shaft of each adjacent belt roller of the two conveyors and a chain interconnects the sprockets. However, whenever a turn is required in the conveyor system, the usual practice is to provide a separate drive motor for the turn because a conventional sprocket-chain drive cannot be aligned upon the adjacent belt roller shafts of the two sections. The shaft of a cylindrical roller at the end of a straight conveyor section is perpendicular to the path of the belt and lies below and parallel to the surface of the belt. On the other hand, the shaft of the conical end roller of a turn will be aligned at an angle with respect to the terminal edge of the belt and will be inclined with respect to the upper surface of the belt turn, and cannot be aligned in parallelism with the shaft of the straight conveyor section if the upper belt surfaces are to form a continuous, uninterrupted path.

Whenever a sprocket-chain drive is used, the shafts carrying the sprockets must be in spaced parallelism and the sprockets must lie in a common plane normal to the shafts. If there is a misalignment of more than approximately 1.5°, the chain will bind on the teeth of one or both of the sprockets to cause a substantial loss of power and undue wear of the sprockets and chain. In some conveyor installations using a straight conveyor section and a turn, in tandem, it is undesirable to provide a separate motor or drive for the turn; however, at present it is necessary to do so because of the shaft misalignment noted above. Thus, there exists a definite need for an improved and simplified arrangement of a drive, such as a sprocket-chain drive to interconnect a straight conveyor and a turn. Such a drive must overcome or obviate the problem created by the inclination of the axis of the conical end roller of the turn with respect to the axis of the straight conveyor.

The present invention was conceived and developed with such need in view and comprises, in essence, a conveyor system having a straight section and a turn, in tandem, with a connective drive formed by a chain and sprockets mounted on the adjacent roller shafts of the straight section and turn, and wherein at least one of the sprockets is self-aligning with respect to the other sprocket regardless of its alignment upon its shaft.

It follows that an object of the invention is to provide a novel and improved self-aligning sprocket-chain drive for interconnecting a straight conveyor belt with a conveyor belt turn.

Another object of the invention is to provide a novel and improved sprocket-chain drive which may be operatively mounted upon shafts which are not parallel but which may be out of alignment several degrees.

Another object of the invention is to provide a novel and improved self-aligning sprocket for use with a sprocket-chain drive where one sprocket, when aligned with the chain, is not normal to its drive shaft, and a guide which holds the sprocket in a proper alignment with the chain.

Another object of the invention is to provide a novel and improved self-aligning sprocket-chain drive which may be mounted upon a pair of shafts which are not parallel, and also, which may be mounted upon the shafts at positions which are not in a common plane normal to at least one of the shafts and thus, the invention provides an operative drive in a situation where one sprocket cannot be located at a proper position upon its shaft with respect to the position of the opposite sprocket upon its shaft.

Other objects of the invention are to provide a novel and improved self-aligning sprocket-chain drive, a self-aligning sprocket therefor and a guide, all being of a simple, neat appearing, economical, rugged and durable construction.

With the foregoing and other objects in view, my invention comprises certain constructions, combinations and arrangements of parts and elements as hereinafter described, defined in the appended claims, and illustrated in the accompanying drawing in which:

FIG. 1 is a plan view of an end portion of a straight conveyor belt and a conveyor belt turn arranged in tandem with the portions of the belts being broken away to show the end rollers of each conveyor section, with the axes of the end rollers being shown by extended dot-dash lines to indicate the angling of one roller with respect to the other when viewed in plan, and with an improved self-aligning sprocket-chain drive connecting the two units together.

FIG. 2 is a sectional elevational view as taken from the indicated line 2-2 at FIG. 1, but on an enlarged scale, with portions of the roller and belt of the straight conveyor belt being broken away to show constructions otherwise hidden from view and with the axes of the end rollers being shown by dot-dash lines to indicate the inclination of one roller with respect to the other when viewed in elevation.

FIG. 8 is an edge view similar to FIG. 7, but showing the sprocket as being fully in section, but with the alignment guide removed, and with broken lines indicating a position the sprocket could assume when in use.

FIG. 9 is an exploded sectional view of the sprocket shown at FIG. 8 and including the alignment guide.

FIG. 10 is an edge view, partially in section, but showing another embodiment of a self-aligning sprocket, but with the alignment guide removed.

FIG. 11 is an exploded view, partially in section, of the sprocket shown at FIG. 10.

Figure 1:
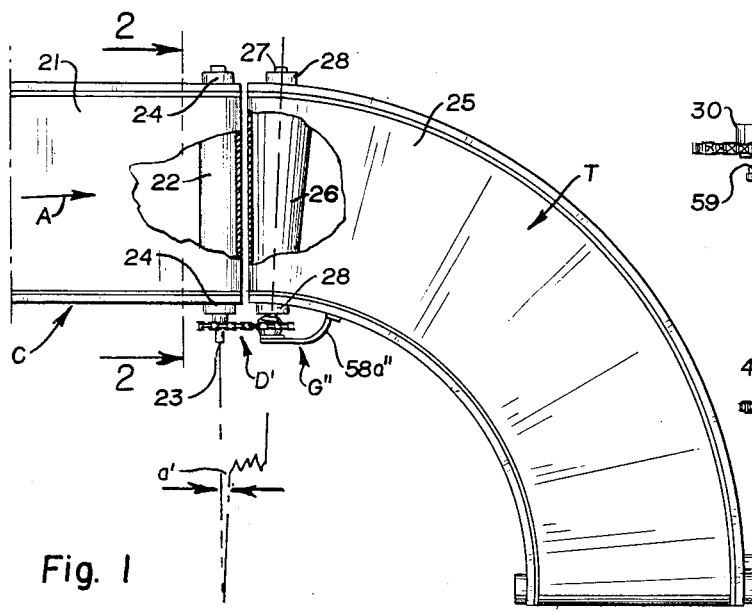

Referring more particularly to the drawing, FIG. 1 illustrates an end of a straight conveyor C connected in tandem with a conveyor turn T. These units will be described as if the movement of the belts is in the direction of the indicated arrow A, from the conveyor to the turn.

The straight conveyor belt 21 wraps about a cylindrical end roller 22 and the shaft 23, carrying this roller, is mounted in suitable bearings 24 in the frame of the conveyor. A portion of the shaft extends from a bearing at one side of the conveyor to carry a sprocket as hereinafter described. The belt 25 of the turn T wraps about a conical roller 26 at its leading edge and the shaft 27 carrying this roller 26 is mounted in suitable bearings 28 in the frame of the turn to extend therefrom at one side to carry a sprocket as hereinafter described.

Figure 2:
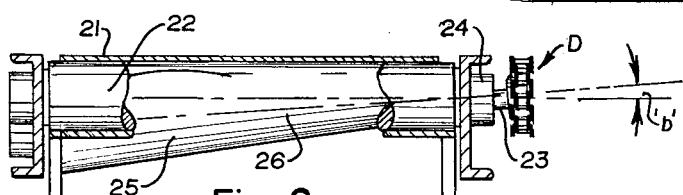

It is to be noted that the terminal edge of the belt 21 of the straight conveyor C is spaced closely adjacent to the leading edge of the curved belt 25 of the turn T. Also, in the usual alignment of the conveyor sections, the top surfaces of the belts 20 and 25 will lie in a common horizontal plane. It follows that the shaft 27 of the conical drive roll 26 will be at an angle 'a' with respect to the shaft 23 of the cylindrical roll 22 when the two are viewed in plan and also at an angle 'b' when the two are viewed in elevation, as indicated at FIGS. 1 and 2 respectively. This misalignment of the two shafts will ordinarily be sufficient to prevent the use of a conventional sprocket-chain drive should it become desirable to drive one conveyor unit by the movement of the other. Accordingly, the present invention contemplates the use of a self-aligning sprocket-chain drive D mounted upon the shafts 23 and 27.

Figure 3:
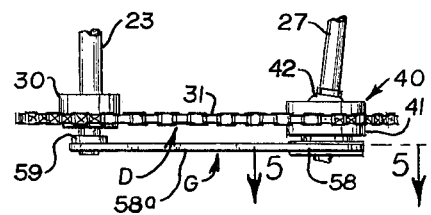
FIG. 3 is a fragmentary plan view of a pair of shafts which are in a nonparallel alignment and which are interconnected by the improved sprocket-chain drive when one self-aligning sprocket is used, and of a guide between the two shafts adapted to hold the self-aligning sprocket in a proper position.

FIG. 3 illustrates, somewhat diagrammatically, the improved self-aligning sprocket-chain drive D which interconnects the two nonparallel shafts 23 and 27. A conventional, fixed sprocket 30 is carried upon the shaft 23 and the chain 31 extends therefrom, about the sprocket to lie in the plane of the sprocket which is normal to the axis of the shaft 23. An improved, self-aligning sprocket 40 is carried upon the shaft 27. It is to be noted that this sprocket 40 has a hub portion 41 which is mounted upon a spherical head 42 and the head 42 is carried upon the shaft 27. The sprocket 40 thus swings on the head 42 and is positioned, preferably by a guide G, so that it will tip into the same plane as that defined by the conventional sprocket 23 and chain 31. When both sprockets 30 and 40 and the chain 31 lie in a common plane, they will not be subject to unnatural wear during operation. However, when so aligned with the chain 31 and sprocket 30, the sprocket 40 will not lie in a plane normal to its shaft 27, but will be inclined with respect to this normal plane, as illustrated at FIG. 3.

Figure 4:
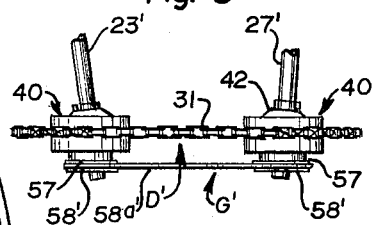
FIG. 4 is a fragmentary plan view similar to FIG. 3, but with each shaft having a self-aligning sprocket and with a guide between the two sprockets adapted to hold the self-aligning sprockets in their proper positions.

FIG. 4 illustrates a modified arrangement for using two self-aligning sprockets in a sprocket-chain drive D' which interconnects two shafts 23' and 27'. In this drive D', the self-aligning sprockets 40 are mounted upon both of the shafts 23' and 27'. A modified guide G', hereinafter further described, is extended between these sprockets to hold them in alignment in a common plane. In contrast with the arrangement shown at FIG. 3, where the self-aligned sprocket 40 must be located at a specific position upon its shaft 27 so as to lie in the plane of the chain 31 and fixed sprocket 30, the arrangement shown at FIG. 4 does not require any such limitation, for the two self-aligning sprockets 40, held by a common guide G', will naturally be tipped on their respective shafts 23' and 27' to alignment in a common plane with the chain for a smooth, wear-free operation. This arrangement, using two self-aligning sprockets 40, is thus a versatile and convenient expedient which may be used at other installations where it is impossible to shift the sprocket on one shaft to a specified position once the sprocket on the other shaft is set. The arrangement may also be advantageously used at installations where the shafts are parallel but space restrictions render it impossible to set conventional sprockets in alignment to lie in a common plane normal to the shafts.

FIGS. 6 through 9 illustrate a preferred construction of the improved self-aligning sprocket 40. The sprocket wheel 43 is a conventional, disclike member having a selected diameter and tooth pitch and central orifice 44 which permits it to be mounted upon the hub 41. This hub 41 is a short, cylindrical member, formed as two opposing, substantially identical sections 41L and 41R which fit together at opposing radial inner faces 45 at the central plane of the sprocket. Each hub section includes an annular, rabbeted shoulder 46 about its inner face and the shoulders of the two hub sections combine to provide an annular socket wherein the sprocket wheel 43 fits. A ring of holes 47 is formed in these shoulders and registering holes 47' are in the base of the sprocket wheel to receive bolts 48 to securely lock the three components together.

The spherical head 42 whereon the hub is mounted is, in turn, mounted upon a shaft such as 27 and thus includes a passageway 49 through it sized to receive the shaft, and may include a keyway 50 therein to permit the head to be locked in position upon the shaft. The spherical surface of the head terminates at each side of the passageway as at a wall 51 at one side and a short, hublike extension 52 at the opposite side. To complete this head 42, an array of longitudinally disposed slots 53 are provided about the spherical surface, with each being centered at the central plane of the head which is normal to the axis of the sprocket and with each being proportioned to receive a half of a holding ball 54 connecting the head with the hub as will be described. In the unit disclosed, four such slots 53, spaced 90° apart are used, however, the number of slots may be three or five or six, if desired. Regardless of the number of slots, it is desirable to space them uniformly about the head.

Figure 7:
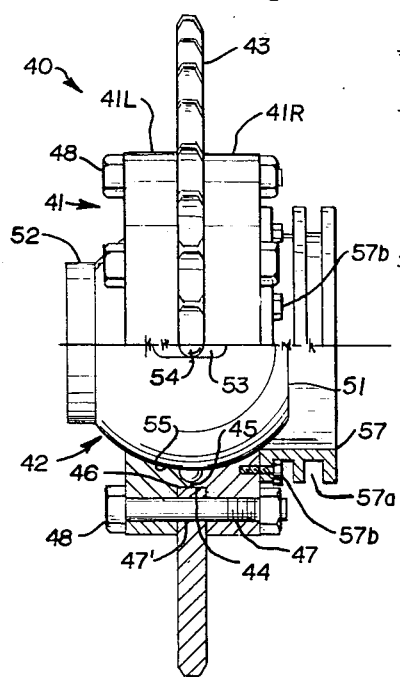
FIG. 7 is an edge view of the sprocket, partially in section, as taken from the indicated line 7-7 at FIG. 6.
Figure 6:
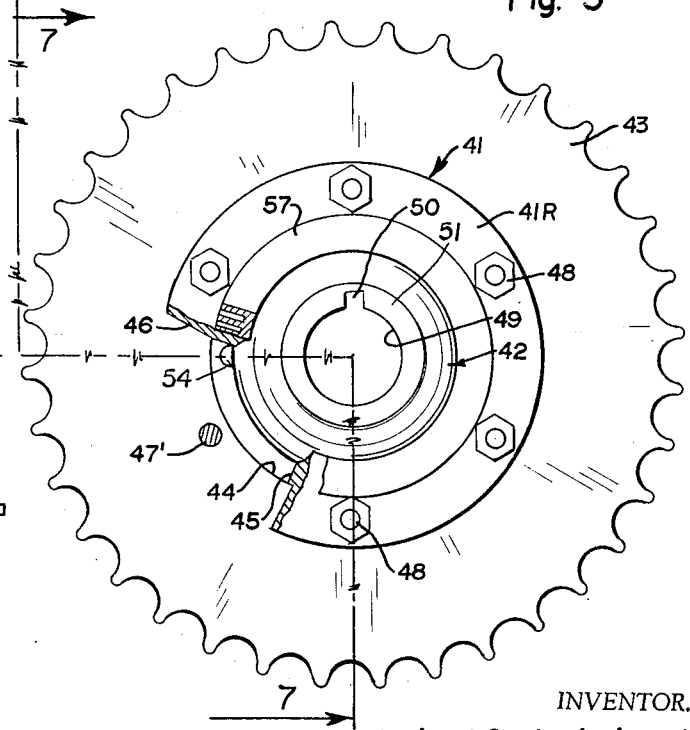
FIG. 6 is a side elevational view of an improved self-aligning sprocket with portions of the hub broken away to show constructions otherwise hidden from view.

Each section 41R and 41L of the hub has a hemispherical, internal bore 55 sized to fit about the spherical head 42 with the inner wall surface 45 of each being at a diametrical equator of the spherical surface. Whenever the two sections are bolted together, the equator of each section joins with the other and will thus be located at the central plane of the head whenever the head and sprocket is in a normal position upon the hub as illustrated at FIGS. 7 and 8. The hub may be rotated sidewise to be tipped as illustrated in broken lines at FIG. 8. An array of hemispherical sockets 56 is formed in this spherical surface of the hub bore 55 at this equator which are adapted to receive and hold the balls 54, and accordingly, these sockets will match the slots 53 on the surface of the head. As best shown in FIG. 8, one half of each socket 56 will be formed in each section 41R and 41L of the hub.

Figure 5:
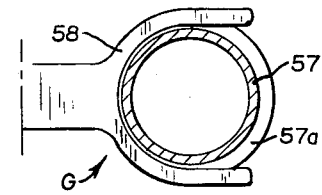
FIG. 5 is a fragmentary sectional detail of a guide member, as taken from the indicated line 5-5 at FIG. 3, to illustrate structural details of one type of restraining device to hold the self-aligning sprocket in a proper position with respect to the other sprocket.

The guide G is required to hold the sprocket in proper alignment, that is, in the plane of the chain and tipped with respect to its shaft. In the form illustrated, this guide will include a bearing face 57 having an annular groove 57a to receive and hold the forks of a yoke 58, FIG. 5. This guide is affixed to one side hub section 41R as by a ring of bolts 57b as illustrated at FIG. 7, with the groove 57a being centered and normal to the axis of the hub.

In the construction of the guide G illustrated at FIG. 3, the arm 58a of this yoke extends to the fixed shaft 53 adjacent to the conventional sprocket 30 to be held by a conventional bearing 59 on the shaft. In the guide G' illustrated at FIG. 4, the arm 58a' includes a yoke 58' at each end to hold a pair of bearing faces 57 mounted on the adjustable sprockets. The guide G'', illustrated at FIG. 1, includes a yoke arm 58a'' which is secured to the wall of the frame of the turn. It is to be noted that the guide arrangements shown at FIGS. 3 and 4 will automatically align the sprockets since the arms 58a and 58a' reach from one shaft to the other, but that the guide G'' shown at FIG. 1, must be aligned by adjustments since that arm 58a'' is necessarily bent to a suitable alignment for mounting the unit.

The operation of the hub 41 and sprocket wheel 43 upon the head 42 may now be described. Basically the hub is restrained on the head and must rotate with the head because of the connection between the two by the balls 54 in the slots 53 and sockets 56. However, the hub is free to tip sidewise with respect to the normal plane of the head, in any direction, with the balls 54 shifting in the slots 53. The guide G will control this tip so that the sprocket 40 will be in the plane of the chain 31. Thus, when the shaft and sprocket are rotating, there will be a continuous tipping or angling of the hub and sprocket upon the head and the balls 54 will continuously shift in the hub slots 53.

It is to be noted that the slots 53, arranged longitudinally upon the spherical head, will converge in spacing at each side from the central normal plane of the head, while the spacing of the balls held by the sockets 56, will remain constant. This would suggest a binding action between the hub and head impairing the operation of the sprocket. However, it was found that whenever a shaft misalignment did not exceed approximately 10°, the convergence of the slots 53 on the head was not great and the natural, necessary operative clearances of the balls 54 in the slots 53 and sockets 56 were such that the unit would operate smoothly, and a sprocket-chain drive incorporating the improved self-aligning hub could be used to operatively interconnect a straight conveyor C and a conveyor turn as above described.

The construction illustrated at FIGS. 10 and 11 discloses a modified, self-aligning sprocket construction wherein the tilting or swiveling action of the sprocket and hub upon the spherical head is effected by a diaphragm between the two members which will flex laterally, but is radially restrained to force the hub and head to rotate together.

In this modified construction, the self-aligning sprocket 40a includes a hub, formed as two opposing similar members 41La and 41Ra, having shoulder portions 46a which form a peripheral slot to hold a sprocket wheel 43a, with a ring of holes 47a about the head members and holes 47a' about the base of the sprocket wheel to receive bolts 48a the same as heretofore described.

The head 42a includes a passageway 49a which may have a keyway 50a to lock it upon a shaft as heretofore described. This head, however, is formed as two parts, with one-half of the spherical surface being on the body 42a of the head and the other half of this spherical surface being formed as a short, tubelike stub 60 carried upon a sleeve 61 extending from the body 42a to complete the spherical surface for holding the hub. The head at the base of the sleeve 61 and the inward side of the stub 60 are each formed with an opposing radial face surface 62, and a resilient washer-shaped diaphragm 63 having an orifice 64 adapted to fit upon the sleeve 61 is mounted between the members. A ring of longitudinally directed countersunk holes 65 is drilled through the stub 60 to register with a ring of holes 65' in the washer and a ring of threaded holes 65" in the head. These holes receive cap screws 66 to lock the two sections together with the diaphragm 63 being tightly held between them. To complete this head, a rabbeted shoulder 67 is provided about the equator of each member to form a circumferential channel wherein the central portion of the washer extends, the channel permitting the washer to flex laterally.

The bore 55a of each hub member 41Ra and 41La is hemispherical to fit upon the head 42a as heretofore described. Also, each hub member includes an opposing radial face surface 68 at its inner wall adjacent to shoulder portions 46a which form the sprocket wheel socket, and the face surfaces 68 hold the outer portion of the diaphragm 63 between them. A ring of countersunk holes 69 in the hub member 45Ra, ring holes 69' through the diaphragm and a ring of threaded holes 69" through the hub member 45La receive cap screws 70 to hold the outer edge of the diaphragm securely between the hub members. To complete this unit, a pair of rabbeted shoulders 71 are provided at the equator of the hub bore to form a channel to supplement the channel formed by shoulders 67, and wherein the central portion of the washer 63 is located, to better permit lateral flexing of the washer.

This washer-shaped diaphragm 63 is made of a tough, resilient material which is preferably of a molded, fiber-reinforced tough type of rubber or like material, but may be of a thin sheet of spring steel. Circumferential ribs 72 may be formed in the wall of this washer in the intermediate portion which lies in the channels formed by shoulders 67 and 70 to facilitate lateral flexing of the diaphragm. This type of washer, of either material, will easily resist rotative torque between the hub and head and when a reinforced rubber diaphragm or the like is used, it will act as a shock absorber to eliminate erratic rotative shocks, and at the same time, flex laterally to permit the head to tilt out of the plane of the normal to the axis of the head to permit the sprocket to align itself, by use of a guide G, to the plane of the chain extending about it. The guide G, not shown at FIGS. 10 and 11, will be mounted upon a hub in the same manner as that heretofore described and the overall operation and function of this modified unit will also be the same as that heretofore described.

I have now described my invention in considerable detail. However, it is obvious that others skilled in the art can devise and build alternate and equivalent constructions which are within the scope of the invention.

I claim:

1. In a conveyor system having a straight belt conveyor extending about a cylindrical roller and a conveyor belt turn in tandem therewith extending about a conical roller, a shaft extension from the cylindrical roller of the straight section adjacent to the turn and an opposing shaft extension from the conical roller of the turn adjacent to the straight section which is not parallel to the shaft extension of the straight section, a drive interconnecting the aforesaid shaft extensions to permit one conveyor unit to be driven by the movement of the other and comprising:
   a. a sprocket on each shaft extension;
   b. a chain about the sprockets; and
   c. an alignment means associated with at least one of the sprockets adapted to tip the sprocket from a plane normal to its shaft to an alignment with the other sprocket, whereby both sprockets lie in a common plane.

2. In the organization set forth in claim 1, wherein said alignment means includes:
   a spherical head mounted upon the shaft extension;
   a hub carrying the aforesaid sprocket shiftably mounted upon the head to permit the sprocket to be tipped out of a plane normal to the axis of the shaft; and
   a holding means between the head and sprocket hub adapted to force one member to rotate with the other, but to permit the hub to tip on the head laterally of the direction of rotation.

3. In the organization set forth in claim 2, wherein said alignment means is provided at both of the sprockets.

4. In the organization set forth in claim 2, wherein said holding means between the head and hub includes:
   a slot at the spherical surface of one member aligned in parallelism with the shaft axis; and
   a follower at the spherical surface of the other member adapted to fit into the slot.

5. In the organization set forth in claim 2, said holding means between the head and hub includes a circumferential array of slots in the spherical head aligned with the axis of the shaft whereon the head is mounted;
   a like circumferential array of sockets at the mating inner surface of the hub; and
   members carried in the sockets adapted to extend into the slots.

6. In the organization set forth in claim 2, wherein said slots are substantially hemicylindrical, said sockets are hemispherical and said members are balls.

7. In the organization set forth in claim 5 wherein said hub comprises:
   two opposing cylindrical members each having an internal, spherical bore adapted to fit upon the head;
   a peripheral, rabbeted shoulder on each member, at its inner face, to form a socket to receive the sprocket; and
   bolt means adapted to secure the three members together upon the hub.

8. In the organization set forth in claim 2, wherein said holding means between the head and hub comprises a washer-shaped diaphragm.

9. In the organization set forth in claim 8, wherein
   said head is split at its equator to receive the inner edge portion of the said diaphragm and said hub is split at its central plane to receive the outer edge portion of the diaphragm; and
   means adapted to secure the diaphragm to each member.

10. In the organization set forth in claim 9, wherein
   a peripheral groove is formed in the head about its equator, at each side of the diaphragm; and
   a like groove is formed in the hub about its spherical surface at each side of the diaphragm whereby to provide space to permit the diaphragm to flex laterally.

11. In the organization set forth in claim 8, wherein said diaphragm is a resilient, fiber-reinforced material.

12. In the organization set forth in claim 8, wherein said diaphragm is of spring steel.

13. In the organization set forth in claim 8, wherein the central portion of said diaphragm is corrugated to ease the lateral flexure thereof.

14. A self-aligning sprocket-chain drive adapted to interconnect and to be mounted upon two spaced shafts which are not parallel and including a sprocket wheel affixed to each shaft and a chain extended about the sprocket wheels and comprising in combination therewith:
- a spherical head adapted to be mounted upon one of the shafts;
- a sprocket wheel including a hub having an internal spherical bore adapted to be mounted upon the head to swivel thereon;
- a guide means interconnecting with the aforesaid hub and adapted to hold the sprocket wheel in the plane of the chain extended about it; and
- a means between the head and hub adapted to force one member to rotate with respect to the other, but to permit the hub to shift the head whereby the sprocket wheel will remain in the plane of the chain and at an inclination with respect to the normal of the shaft.

15. In the sprocket-chain drive defined in claim 14, wherein both sprockets include a spherical head adapted to be mounted upon the respective shafts;
- a sprocket wheel including a hub having an internal spherical bore adapted to be mounted upon each head to swivel thereon;
- and wherein said guide means includes:
- a bar member interconnecting with each aforesaid hub to hold the sprocket wheels in a common plane which is the plane of the chain extending about the wheels.

16. In the sprocket-chain drive defined in claim 14, wherein the guide means includes a peripheral slot about a portion of the hub at one side of the sprocket wheel; and
an arm including a yoke adapted to fit into the slot.

17. In the sprocket-chain drive defined in claim 14, wherein said means between the head and the hub includes:
- sockets in one member;
- transversely extended slots in the other member, in registration with the sockets; and
- balls fitted into the sockets and projecting therefrom into the slots.

18. In the sprocket-chain drive defined in claim 14, wherein said means between the head and the hub includes:
- a washer-shaped, flexible diaphragm affixed to each member;
- a groove in the head about its equator at each side of the diaphragm; and
- a like groove in the hub about its equator at each side of the diaphragm to permit the diaphragm to flex laterally.

19. In the sprocket-chain drive defined in claim 18, wherein the diaphragm is a resilient, fiber-reinforced material.

20. In the sprocket-chain drive defined in claim 18, wherein the diaphragm is spring metal.

21. In the sprocket-chain drive defined in claim 18, wherein the diaphragm is circumferentially corrugated.